L. MUTHER & W. M. SPRYE.
DEVICE FOR MOUNTING THE FEED DISKS IN SKIVING MACHINES.
APPLICATION FILED SEPT. 1, 1910.
1,092,122.
Patented Mar. 31, 1914.
2 SHEETS—SHEET 1.
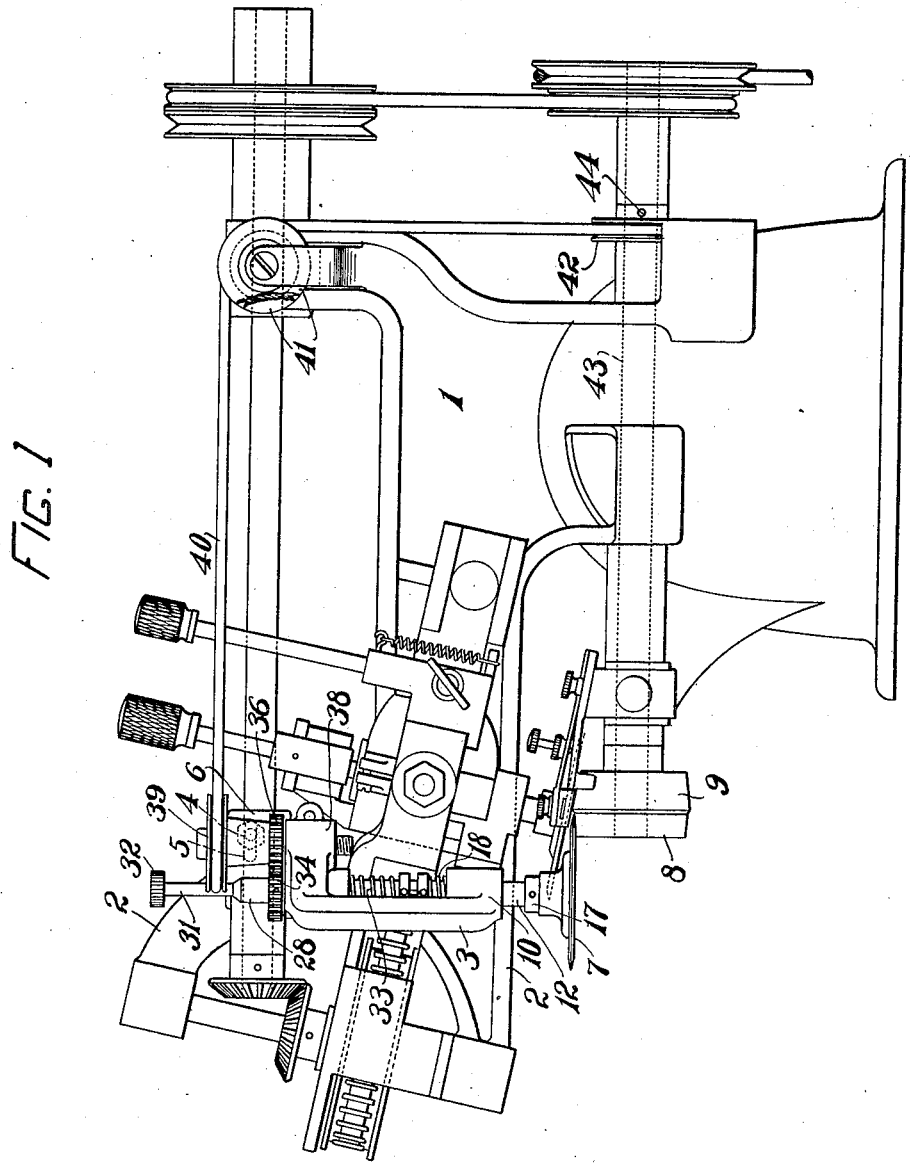

L. MUTHER & W. M. SPRYE.
DEVICE FOR MOUNTING THE FEED DISKS IN SKIVING MACHINES.
APPLICATION FILED SEPT. 1, 1910.
1,092,122.
Patented Mar. 31, 1914.
2 SHEETS—SHEET 2.
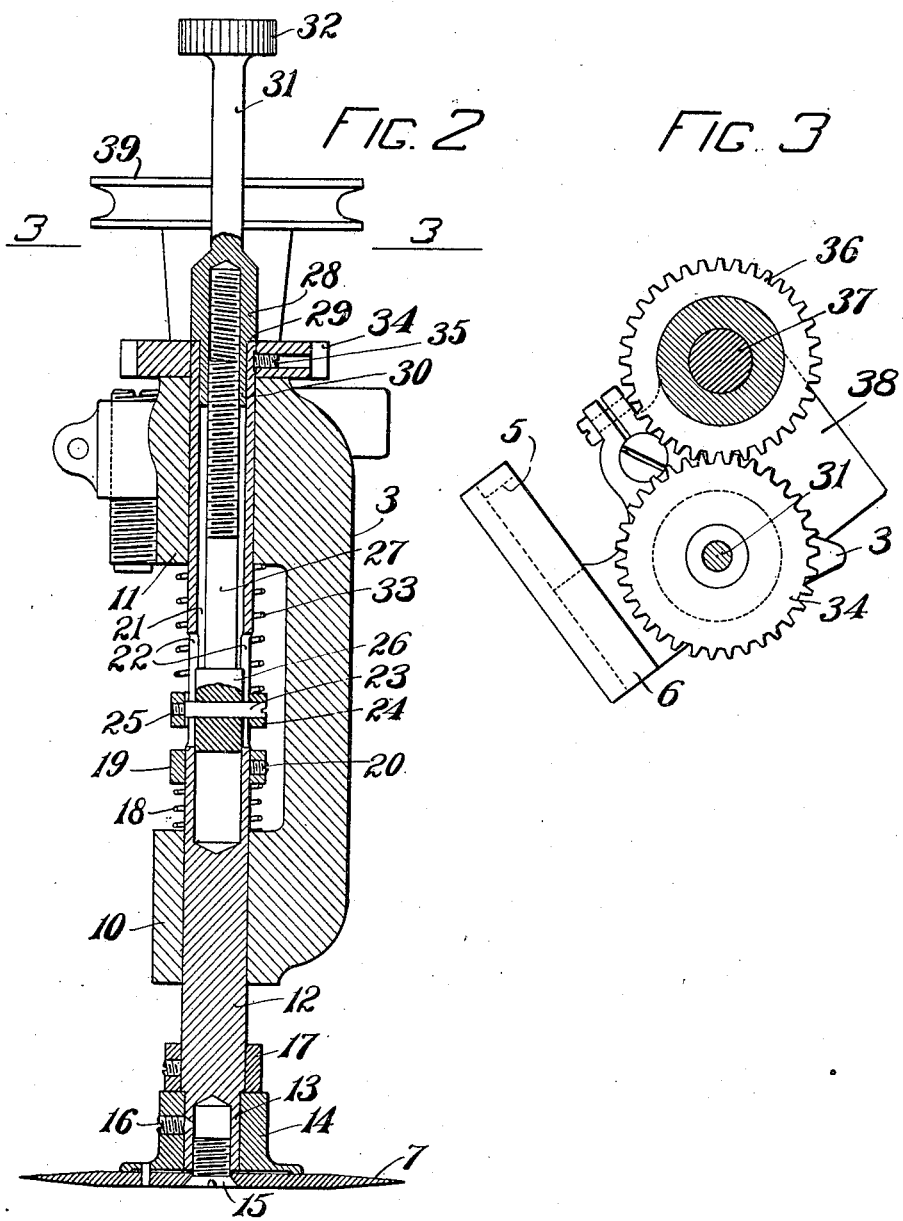

UNITED STATES PATENT OFFICE.

LORENZ MUTHER, OF WEST NEWTON, AND WILLIAM M. SPRYE, OF LYNN, MASSACHUSETTS; SAID SPRYE ASSIGNOR TO SAID MUTHER.

DEVICE FOR MOUNTING THE FEED-DISKS IN SKIVING-MACHINES.

1,092,122.  Specification of Letters Patent.  Patented Mar. 31, 1914.

Application filed September 1, 1910. Serial No. 580,018.

*To all whom it may concern:*

Be it known that we, LORENZ MUTHER, of West Newton, county of Middlesex, and State of Massachusetts, and WILLIAM M. SPRYE, of Lynn, county of Essex, State of Massachusetts, citizens of the United States, have invented certain new and useful Improvements in Devices for Mounting the Feed-Disks in Skiving-Machines, of which the following is a specification, reference being had to the drawings accompanying the same and forming a part thereof.

Our invention relates to improvements in a device for mounting the feed disk in skiving machines, and particularly to the shaft to which the feed disk is attached and to the adjusting mechanism for adjusting the tension of the presser springs mounted on said shaft.

The object of our invention is to so construct the shaft to which the feed disk is attached that by the use of an adjusting screw coöperating with one or more springs, the tension of the springs may be so adjusted as to either practically support the weight of the shaft and feed disk, or so as to produce a given pressure of the feed disk upon the work operated upon, as desired, together with other features of the invention as will more fully appear in the specification and claims.

In the drawings accompanying this specification—Figure 1 is a side elevation of a skiving machine with our improved device for mounting the feed disk attached; Fig. 2 is a vertical section of the feed disk and supporting mechanism; and Fig. 3 is a sectional plan view of our device for mounting the feed disk taken through line 3—3, Fig. 2.

In the drawings accompanying the specification and forming a part thereof, 1 represents the frame of the machine, which is provided with a portion 2 extending forwardly, to which the frame 3 of the mechanism supporting the feed disk is attached and held thereon by a screw 4 which passes through a slot 5 in the foot 6 of the frame 3, so as to be laterally adjusted in order that the feed disk 7 may be moved to and from the portion 8 of the feed-roll 9.

The supporting mechanism of the feed disk 7 consists, as before stated, of the frame 3 having bearings 10 and 11 in which is mounted a shaft 12 so that it can move vertically therein, as well as rotatably. The shaft 12 has a shouldered portion 13 at its lower end to receive the hub 14 of the flange to which the feed disk 7 is secured by means of the screw 15. The hub 14 is prevented from rotating by the set screw 16. The lower end of the shaft 12 is also provided with a movable collar 17 which may be adjusted lengthwise of said shaft 12 to limit its vertical movement. Above the bearing 10 is mounted a spring 18 surrounding the shaft 12, the lower end of the spring resting upon the upper end of the bearing 10; its upper end bears against an adjustable collar 19, used to adjust the tension of the spring 18, the collar being provided with a set screw 20 to retain it in its adjusted position. A hole 21 is drilled axially through the upper end of the shaft 12 and is provided with slots 22, 22, extending laterally through it. The slots are adapted to receive a screw 23 which passes through one side of the collar 24, and is threaded in the other side of it at 25. The screw 23 also passes through the end 26 of an adjusting bolt 27. The adjusting bolt 27 is threaded on its upper end to receive the internal threaded portion of an adjusting screw 28, the screw 28 having a shoulder 29 to bear upon the upper end of the shaft 12 and a portion 30 which fits in the hole in the upper end of the shaft 12. This adjusting screw is provided with an extension 31 having a knurled handle 32 in its upper end.

The spring 33 surrounds the shaft 12, its upper end bearing against the under side of the bearing 11 and its lower end against the top of the collar 24. It serves to push the shaft 12 axially downward, while the spring 18 serves to move the shaft 12 upward.

The operation of the adjusting device for adjusting the tensions of the springs 18 and 33 is as follows:—If it is desired to press the feed disk 7 downwardly with greater tension upon the work, the adjusting screw 31 is turned by the knurling head 32 in such way as to screw downwardly upon the adjusting bolt 27 and draw it upwardly into the threaded portion 30. This draws the collar 24 upwardly and presses against the spring 33 to compress it between the upper surface of the collar 24 and the under surface of the bearing 11. This serves to move the shaft axially downward by increasing the tension upon the spring 33 and to overcome the lifting tension of the spring 18. If it is desired to have less tension, or practically support the shaft 12, the adjusting screw 31 is turned in the opposite direction, thus lowering the adjusting bolt 27 and collar 24, and gradually taking the tension off the spring 33, causing the tension on the spring 18 to push the shaft 12 upwardly. When the adjusting mechanism is in the latter position the spring 18 practically supports the weight of the shaft 12.

The feed disk 7 is rotated by means of a gear 34 secured upon the shaft 12 by a set screw 35. The gear 34 enmeshes with a gear 36 which is mounted upon a stud 37. The stud 37 is secured in the portion 38 of the frame 3. Above the gear 36 is mounted a pulley 39 adapted to receive the belt 40. The belt 40 passes around the pulley 39, over idler pulleys 41 secured upon the frame 1 of the machine and down around a pulley 42 which is mounted upon a driving shaft 43 secured thereto by a set screw 44, the whole being arranged so that when the driving shaft 43 is rotated it will rotate the gear 36 through the pulley 39, and in turn will rotate the gear 34, the shafting 12, thus rotating the feed disk 7.

The invention is not limited to the specific means for rotating the feed disk 7 and the shaft 12, or to the exact form of the adjusting mechanism, as various modifications may be made without departing from the spirit of our invention.

What we claim is—

1. In a skiving machine, a feed disk; means for carrying and adjusting the tension on the feed disk, comprising a shaft upon which the feed disk is mounted, having an axial hole in its upper end, and an elongated transverse slot in its mid-portion; bearings in which said shaft is axially and rotatively movable; a plurality of springs mounted on said shaft; means mounted in said shaft, and means mounted upon the same, both movable axially thereof for increasing the tension on either of said springs, as desired.

2. In a skiving machine, a feed disk; a device for mounting and adjusting the feed disk, comprising a frame having bearings; a shaft mounted in said bearings to be rotatively and axially movable therein; a plurality of springs mounted on said shaft; a plurality of adjustable collars mounted on said shaft; and means mounted in said shaft for moving one of said collars axially thereof to increase or decrease the tension on one of said springs, and at the same time to compress or relieve the compression on the other of said springs.

3. In a skiving machine, a feed disk; a device for mounting and adjusting the feed disk, comprising a laterally adjustable frame with means for securing it in its adjusted position; bearings in said adjustable frame; a shaft mounted in said bearings to be rotatively and axially movable therein; a plurality of springs mounted on said shaft; a plurality of adjustable collars mounted on said shaft; means mounted in said shaft for moving one of said collars axially thereof to increase or decrease the tension on one of said springs, and at the same time to compress or relieve the compression on the other of said springs.

In witness whereof, we have hereunto set our hands, in the presence of two subscribing witnesses, this the eleventh day of August A. D. 1910.

LORENZ MUTHER.
WILLIAM M. SPRYE.

Witnesses:
F. J. V. DAKIN,
H. M. KELSO.

Copies of this patent may be obtained for five cents each, by addressing the "Commissioner of Patents, Washington, D. C."